United States Patent [19]

Hara

[11] Patent Number: 5,767,837
[45] Date of Patent: Jun. 16, 1998

[54] DISPLAY APPARATUS

[75] Inventor: Zenichiro Hara, Nagasaki, Japan

[73] Assignee: Mitsubishi Denki Kabushiki Kaisha, Tokyo, Japan

[21] Appl. No.: 47,615

[22] Filed: Apr. 16, 1993

Related U.S. Application Data

[63] Continuation of Ser. No. 933,566, Aug. 24, 1992, abandoned, which is a continuation of Ser. No. 468,209, Jan. 22, 1990, abandoned.

[30] Foreign Application Priority Data

May 17, 1989 [JP] Japan .................... 1-124008

[51] Int. Cl.$^6$ .................... G09G 5/02
[52] U.S. Cl. .................... 345/152; 345/22; 345/72; 345/83
[58] Field of Search .................... 340/752, 754, 340/716, 717, 793, 702, 703, 815.04; 358/240, 242; 345/30, 40, 4, 1, 151, 152, 22, 72, 83

[56] References Cited

U.S. PATENT DOCUMENTS

| 4,368,485 | 1/1983 | Midland ................... 340/701 |
|---|---|---|
| 4,661,809 | 4/1987 | Anderson et al. ................... 340/793 |
| 4,723,119 | 2/1988 | Morimoto ................... 340/702 |
| 4,734,779 | 3/1988 | Levis et al. . |
| 5,053,765 | 10/1991 | Sonehara et al. . |

FOREIGN PATENT DOCUMENTS

| 0 372 525 | 6/1990 | European Pat. Off. . |
|---|---|---|
| 59-18347 | 2/1984 | Japan . |
| 62-12258 | 1/1987 | Japan . |
| 62-75513 | 4/1987 | Japan . |
| 63-174377 | 11/1988 | Japan . |
| 64-2086 | 1/1989 | Japan . |
| 2-165188 | 6/1990 | Japan . |

OTHER PUBLICATIONS

*Patent Abstracts of Japan*, vol. 8, No. 228, Oct. 19, 1984 (No. 59-109028).

Primary Examiner—Lun-Yi Lao
Attorney, Agent, or Firm—Burns, Doane, Swecker & Mathis, LLP

[57] ABSTRACT

According to a display apparatus of the present invention there can be obtained a smooth display picture free from roughness, of high resolution and high luminance by allowing a local ununiformity in the arrangement pitch of light emitting pixels to an allowable extent under the conventional simple signal processing wherein sampling of a television signal is performed at fixed intervals of time.

7 Claims, 9 Drawing Sheets

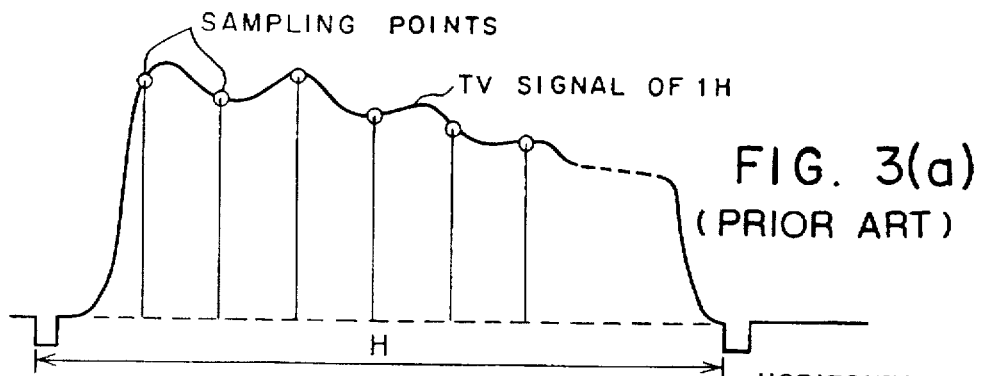
FIG. 3(a) (PRIOR ART)
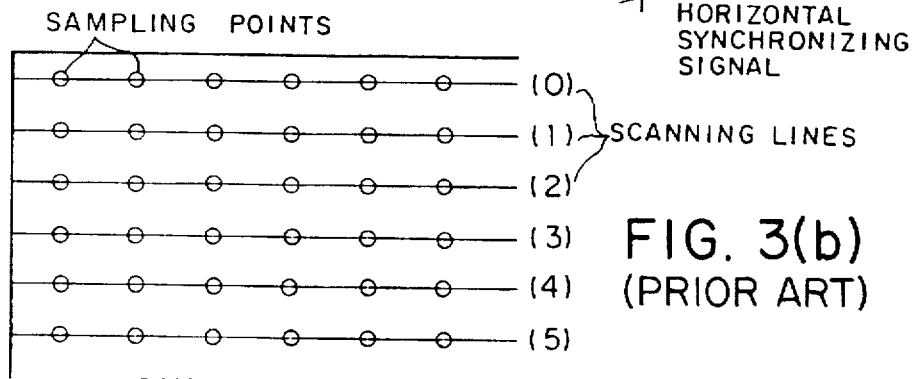
FIG. 3(b) (PRIOR ART)
FIG. 3(c) (PRIOR ART)
FIG. 3(d) (PRIOR ART)
| LIGHT EMITTING ELEMENTS 2 CORRESPONDING TO SAMPLED DATA ITEM NUMBER | | | | | | |
|----|----|----|----|----|----|---|
| 01 | 02 | 03 | 04 | 05 | 06 |   |
| 11 | 12 | 13 | 14 | 15 | 16 |   |
| 21 | 22 | 23 | 24 | 25 | 26 |   |
| 31 | 32 | 33 | 34 | 35 | 36 |   |
| 41 | 42 | 43 | 44 | 45 | 46 |   |
| 51 | 52 | 53 | 54 | 55 | 56 |   |

DISPLAY APPARATUS

This application is a continuation of application Ser. No. 07/933,566, filed Aug. 24, 1992, now abandoned which is a continuation of application Ser. No. 07/468,209, filed Jan. 22, 1990, now abandoned.

BACKGROUND OF THE INVENTION

1. Field of the Invention

The present invention relates to a display apparatus, particularly a color display apparatus for a large screen, comprising a large number of display devices each having a plurality of light emitting pixels arranged in the form of a matrix.

2. Description of the Prior Art

FIG. 1 is a perspective view showing a display device used in a conventional display apparatus such as that described, for example, in Japanese Utility Model Laid-Open No. 12258/87. In FIG. 1, the reference numeral 1 denotes a display device; numeral 2 denotes each of a plurality light emitting pixels 2 being arranged in a matrix form on the display surface of the display device 1; and numeral 3 denotes each of the control electrodes for driving the light emitting pixels 2. The reference mark $T_1$ represents a spacing between adjacent light emitting pixels 2, and $T_2$ represents a spacing between the marginal portion of the display device 1 and the light emitting pixels 2. The spacing $T_2$ corresponds to the thickness of each side wall of the vessel which forms the display device 1.

FIG. 2 shows an example of a portion of a display screen of the display apparatus composed of the display devices 1. FIGS. 3(a)-(d) the relation between sampling a television signal and displaying it.

The operation will be described below.

In FIG. 1, an appropriate space $T_1$ is required between adjacent light emitting pixels 2 of the display device 1. This is because of the premise that a large screen display is to be constituted by arranging a large number of the display devices 1 as shown in FIG. 2. The space $T_1$ is at least twice the thickness the wall thickness $T_2$. Consequently, on the screen as the display portion there are arranged a large number of the light emitting pixels 2 at equal intervals.

FIGS. 3(a)-(d) show the relation between television signal processing and display. FIG. 3(a) shows a television signal of 1H and FIG. 3(b) shows how the television signal is sampled at a predetermined certain interval of time. Further, FIGS. 3(c) and (d) show the relation between sampled signal data at sampling points 01, 02, 03, ... on scanning lines 0, 1, 2, 3, ... and the arranged light emitting pixels 2, in which the television signal sampling rate is constant in correspondence to the light emitting pixels 2 which are arranged at equal pitches. In the display apparatus of this type, the luminance in the emission of light of each light emitting pixel 2 is controlled so as to be proportional to the amplitude of the television signal. Although the light emitting pixels 2 are arranged discretely at predetermined intervals, when seen from an appropriate distance, they can be recognized as a continuous television picture.

On the other hand, the recent trend toward a larger screen display requires a higher resolution which increases the number of picture elements per unit area. FIGS. 4(a)-(b) show an example of how to attain a higher resolution. FIG. 4(a) shows a joint portion between conventional display devices 1 and FIG. 4(b) shows a joint portion between display devices 1 each having four-fold density of light emitting pixels 2 to increase the resolution. Since it is difficult to decrease the wall thickness $T_2$ of each display device 1, a great conflict develops between keeping the picture element pitch equal in the joint portion of two display devices 1 and making the space $T_1$ between adjacent light emitting pixels 2 small.

Since the conventional display apparatus is constructed as above, the light emission area of each light emitting pixel becomes smaller with an increase in the density of the light emitting pixels when pursuing a higher resolution of display, as can be seen also from FIGS. 4(a)-(b). This results in emphasizing the discontinuance of a discrete arrangement of picture elements, which causes a roughness of a television picture when displayed, thus leading to the deterioration of the picture quality. Further, the surface luminance of the display screen becomes lower.

SUMMARY OF THE INVENTION

The present invention has been accomplished for overcoming the above-mentioned problems and it is an object thereof to provide a display apparatus in which some consideration is given to the arrangement of picture elements on each display device, thereby permitting the display of a smooth and high luminance picture with a high resolution and with less roughness on a screen while maintaining the conventional way of signal processing.

According to the construction of the display apparatus of the present invention, each two, three or four light emitting pixels adjacent to one another in the row and/or column direction on a display screen are arranged in groups so that the intragroup arrangement pitch, $P_0$, of the light emitting pixels in each group is smaller than the intergroup arrangement pitch $P_1$, of adjacent groups, and yet the light emitting pixels are operated on the basis of television signal data sampled at predetermined intervals of time.

The above and other objects of the present invention will become apparent from the following detailed description of an embodiment of the invention taken in connection with the accompanying drawings.

BRIEF DESCRIPTION OF THE DRAWINGS

FIGS. 3(a)-3(d) illustrate the relationship between sampling a television signal at constant intervals and displaying sampled data on the conventional display apparatus;

DETAILED DESCRIPTION OF THE PREFERRED EMBODIMENT

An embodiment of the present invention will be described below with reference to the drawings.

Figure 9:
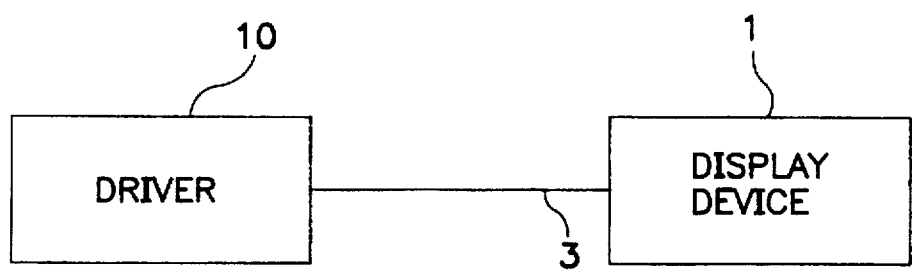
FIG. 9 illustrates an arrangement of the elements of a display apparatus according to an embodiment of the present invention.

FIG. 9 illustrates an arrangement of the elements of a display apparatus according to an embodiment of the present invention. In FIG. 9 a display device 1 and control electrodes 3 are driven by driver 10 which causes each of the light emitting pixels of the display device 1 to emit light on the basis of data obtained by sampling a television signal at fixed intervals of time.

Figure 1:
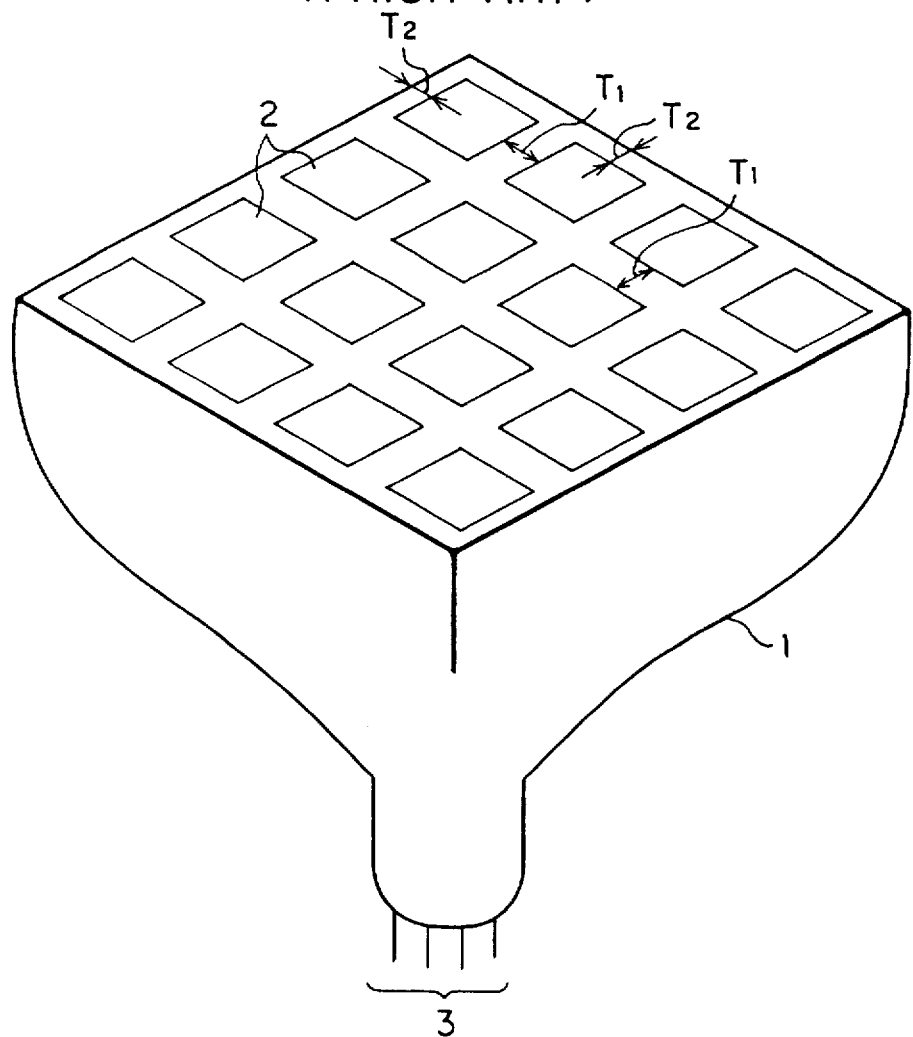
FIG. 1 is a perspective view showing a display device as a component of a conventional display apparatus.
Figure 2:
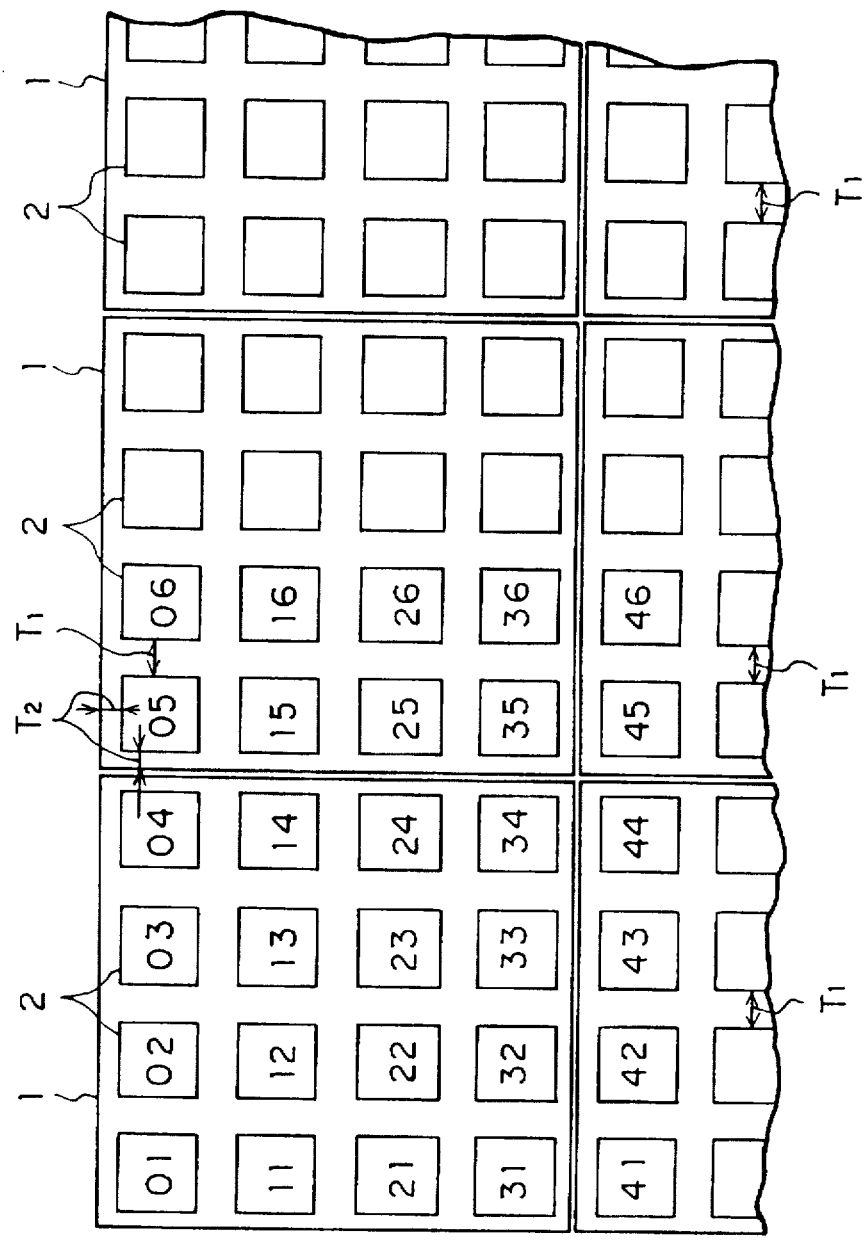
FIG. 2 is a front view showing a principal portion of the conventional display apparatus.
Figure 4A:
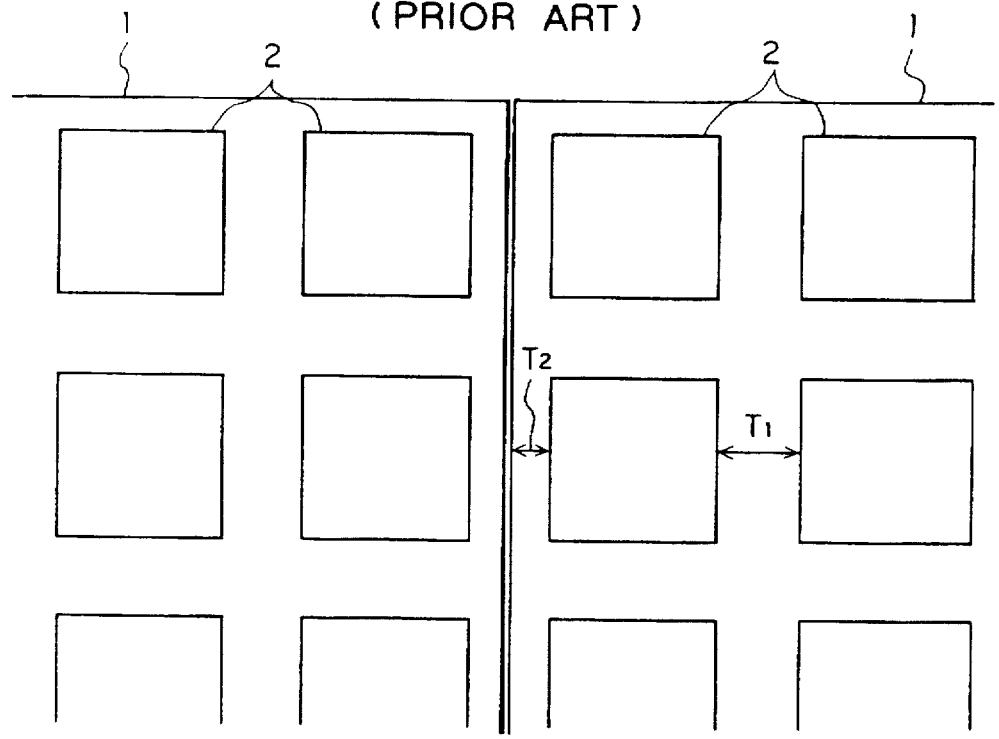
FIGS. 4(a)-4(b) illustrate principal portions of the conventional display apparatus for explaining a problem posed by the tendency of higher resolution of the conventional display apparatus.
Figure 4B:
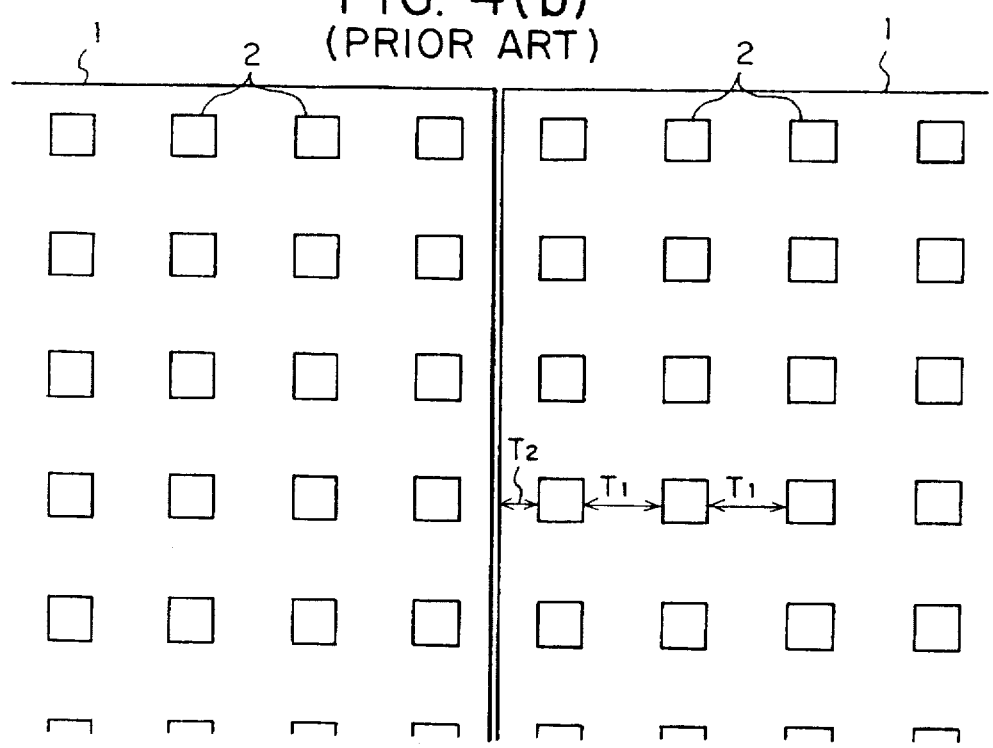
Figure 5B:
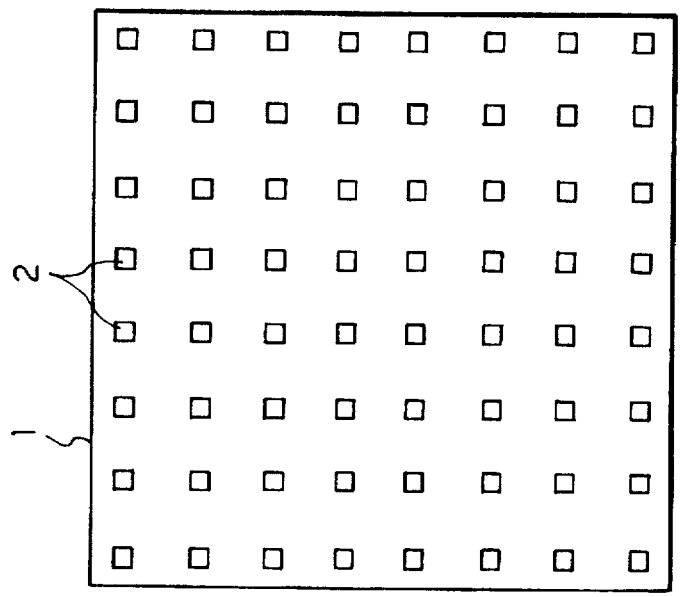
FIG. 5(b) illustrates a front view of a prior art display device.
Figure 5A:
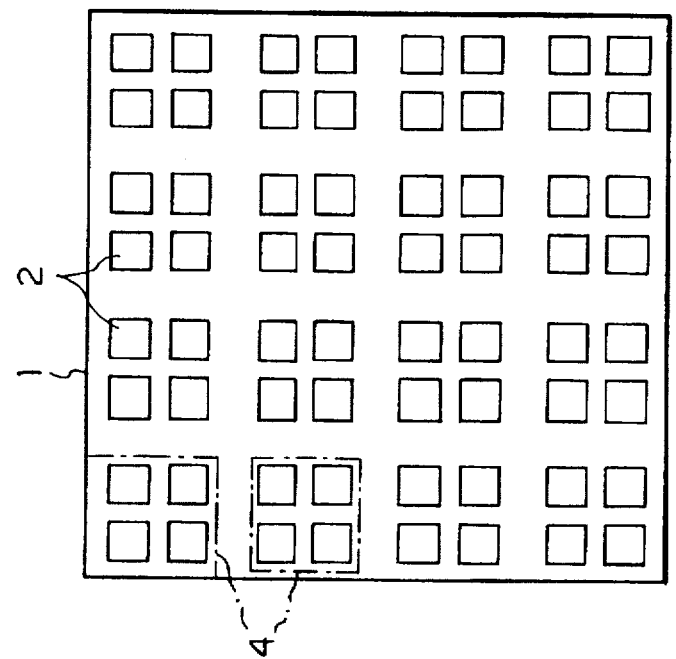
FIG. 5(a) is a front view showing a display device in a display apparatus according to an embodiment of the present invention.

FIG. 5(a) shows, for example, an arrangement of picture elements in a display device 1 for high resolution display used in a display apparatus according to an embodiment of the present invention, while FIG. 5(b) shows a picture element arrangement according to the prior art for a purpose of comparison. In FIG. 5(a), four light emitting pixels 2 adjacent to one another in both the row direction and column direction are grouped together as indicated by the reference numeral 4 and the area of each light emitting pixel 2 in each group 4 is increased.

Figure 6:
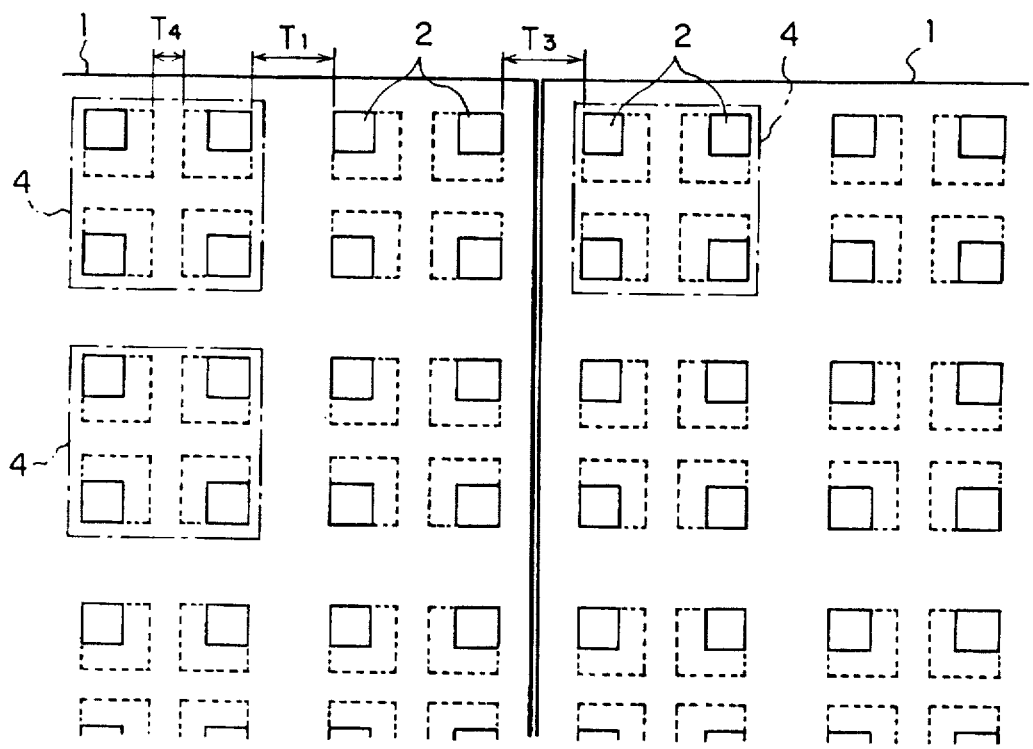
FIG. 6 is a front view of a principal portion for explaining how to increase areas of light emitting pixels of the display apparatus using the display devices shown in FIG. 5(a)

FIG. 6 shows how to enlarge the area of each light emitting pixel 2. In FIG. 6, a space $T_1$ which is almost equal to a space $T_3$ in the joint portion of the display devices 1 has heretofore been provided between light emitting pixels 2 indicated with solid lines, while in the present invention it is provided between adjacent groups 4 of light emitting pixels 2. At the same time, the area of each picture element 2 is enlarged as indicated with broken lines by reducing the space $T_4$ between adjacent light emitting pixels 2 in each group 4 smaller than the space $T_1$.

The operation will be described below.

Since the light emitting pixels 2 are arranged in groups 4 as shown in FIGS. 5(a) and 6, the condition that the light emitting pixels 2 should be arranged in equal pitches as in the prior art is no longer satisfied. More particularly, in the conventional signal processing, sampling is performed with a certain period in correspondence to an equal pitch arrangement of the light emitting pixels 2, but in order to reproduce a television picture exactly and in the case of an unequal pitch arrangement of the light emitting pixels 2 as in the present invention, it becomes necessary to change the sampling period accordingly. It is possible to change the sampling period in the horizontal direction, but in the vertical direction the television signal itself is sampled by scanning lines and is in the form of a discrete signal at a certain period, so it is not easy to change that period.

Taking the above into consideration, the present invention premises sampling with a certain period which can be easily realized technically. And studies were made synthetically about the trade-off between the following two points occurring under the above premise.

A. Picture Quality Improving Effects (roughness diminishing effect and luminance enhancing effect)

The increase of the light emission area is effective in diminishing the roughness of display and obtaining a high quality picture in a display apparatus in which picture elements are arranged discretely as shown, for example, in Japanese Patent Laid-Open No. 2086/89. Further, as is also apparent from FIG. 5(a), with the increase in the light emission area of the light emitting pixels 2, it is possible to easily attain a high luminance of display.

B. Picture Distortion

When picture data sampled with a certain period are displayed in a display apparatus having picture elements arranged at unequal pitches, that is, when the picture element arrangement pitch and the signal sampling period are not in corresponding relation to each other, picture distortion occurs.

Figure 7:
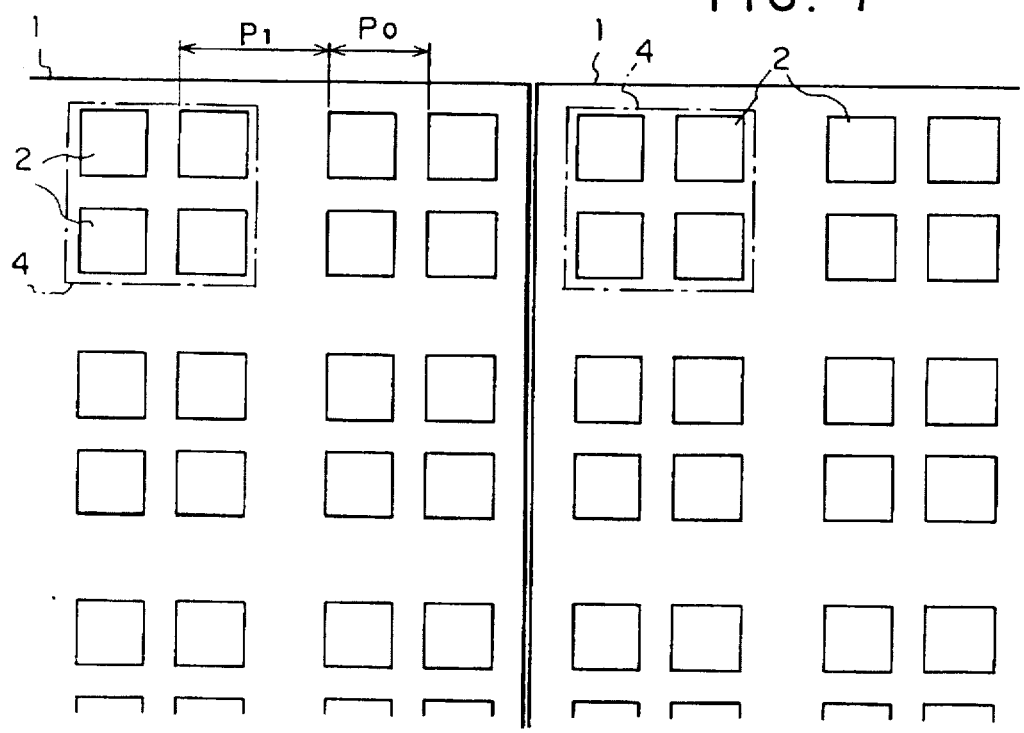
FIG. 7 is a front view of a principal portion for explaining an intragroup arrangement pitch $P_0$ of light emitting pixels and an intergroup arrangement pitch $P_1$ in the display apparatus of FIG. 6.

If the intergroup arrangement pitch between adjacent groups 4 of light emitting pixels 2 is $P_1$ and the intragroup arrangement pitch between adjacent light emitting pixels 2 in each group is $P_0$ ($<P_1$), as shown in FIG. 7, the unequal pitch rate of the light emitting pixels 2 is defined by the following equation:

$$\alpha = P_0/P_1$$

According to experimental results, if sampling is performed with a certain period when $0.8 \leq \alpha < 1.0$, the effect of the above A predominates, affording a picture extremely high luminance and high quality.

Although in the above embodiment the picture elements were arranged in high density in both row and column directions, the same effect is obtained also when such high densification is applied to either the row or the column direction.

As to the color of each light emitting pixel 2, as shown in FIGS. 8(a)–(f), there are, for example, several kinds of color schemes of the light emitting pixels 2, and the present invention is effective in all of them.

Figure 8:
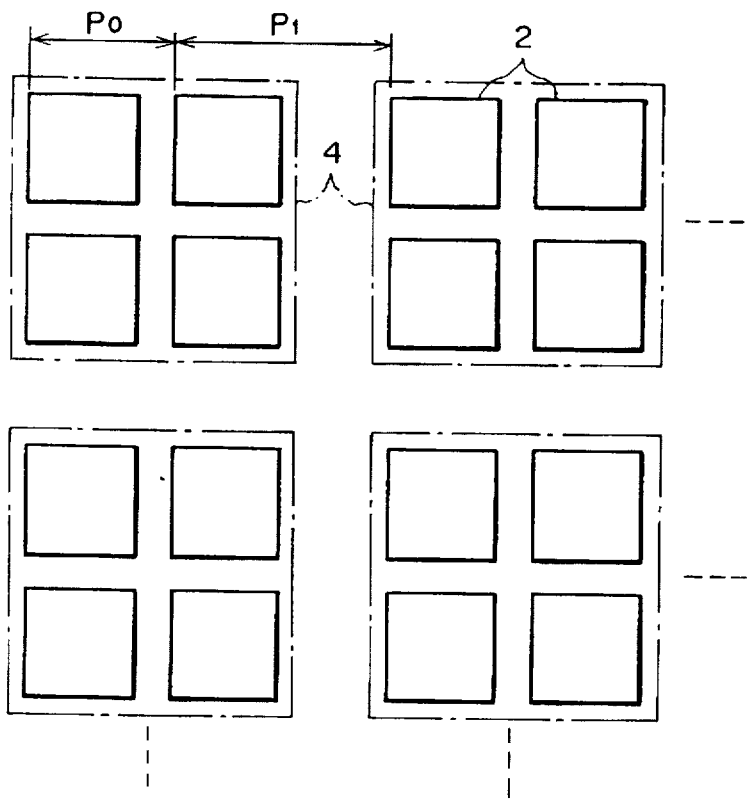
FIGS. 8(a)–(f) are a diagram showing arrangement examples of 20 grouped light emitting pixels in cases of monochromatic display and color display in the display apparatus shown in FIG. 7.
Figure 8:
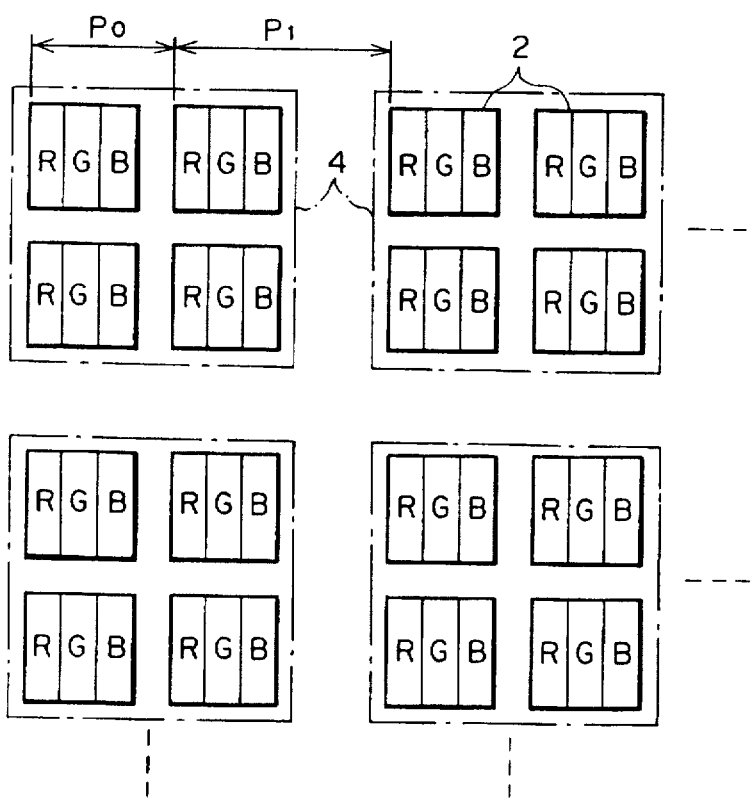
Figure 8:
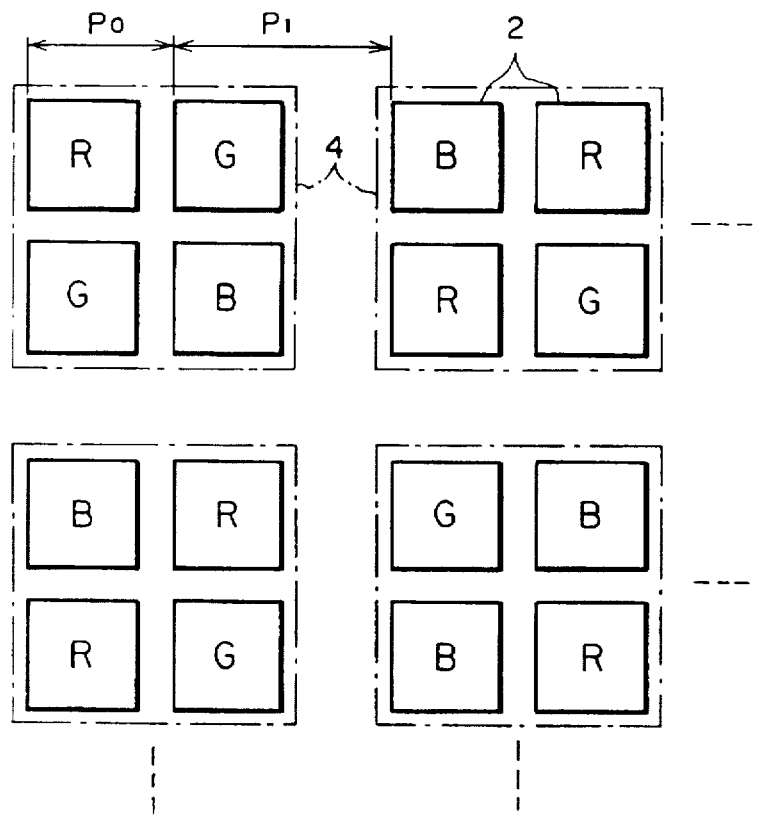
Figure 8:
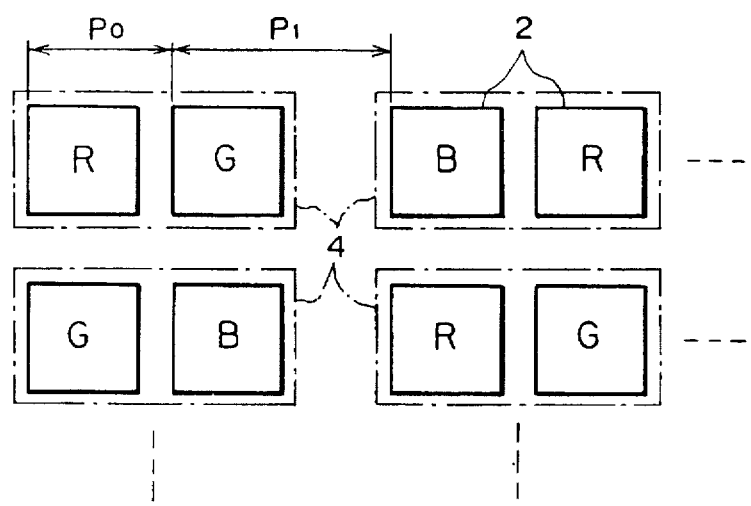

(1) Monochromatic display, as shown in FIG. 8(a).

(2) Each light emitting pixel 2 is composed of three colors of R, G and B each of which can be controlled individually, as shown in FIG. 8(b).

(3) Each light emitting pixel 2 is composed of any one of R, G and B colors, and three colors of light emitting pixels 2 are arranged regularly, as shown in FIGS. 8(c)–(d).

According to the present invention, as set forth above, two, three or four adjacent light emitting pixels in the row and/or column direction in the display portion are made one group and the intragroup arrangement pitch of the light emitting pixels in each group is made shorter than the intergroup arrangement pitch of adjacent groups, further, each of the light emitting pixels are operated individually on the basis of television signal data sampled with a certain period. Consequently, there is obtained a smooth, roughness-free display of extremely high luminance and quality.

What is claimed is:

1. A display apparatus including:
   a plurality of display devices each having a plurality of light emitting pixels, each pixel including a group of different monochromatic luminescent elements, said pixels being arranged in a matrix form in groups of four in a square configuration so that an intragroup arrangement pitch $P_0$ between monochromatic luminescent groups in each of the pixel groups is smaller than an intergroup arrangement pitch $P_1$ between monochromatic luminescent groups in adjacent pixel groups, said monochromatic luminescent elements being arranged so that the intragroup arrangement pitch $P_0$ for each pixel in each pixel group is smaller than the intergroup arrangement pitch $P_1$ between adjacent pixel groups; and drive means for causing each of said light emitting pixels of each of said display devices to emit light in one-to-one correspondence to said data obtained by sampling each individual television signal at fixed intervals of time.

2. A display apparatus according to claim 1, wherein when an unequal pitch rate $\alpha$ is defined as an equation $\alpha=P_0/P_1$, said apparatus satisfies a relation of $0.8 \leq \alpha < 1.0$.

3. A display apparatus comprising:

a plurality of display devices, each of said plurality of display devices including:

a plurality of light emitting pixel groups, each group comprising a plurality of light emitting pixels, each pixel including a group of different monochromatic luminescent elements, arranged so that a pitch $P_0$ between adjacent light emitting pixels of the same pixel group is less than a pitch P1 between adjacent pixel groups, said groups of monochromatic luminescent elements arranged so that the pitch $P_0$ between adjacent monochromatic luminescent groups in one group of pixels is less than the pitch $P_1$ between monochromatic luminescent groups in adjacent pixel groups.

4. A display apparatus according to claim 3, wherein said plurality of light emitting pixels are arranged in matrix form in groups of four.

5. A display apparatus comprising:

a plurality of display devices, each of said plurality of display devices including:

a plurality of light emitting pixel groups, each group comprising a plurality of light emitting pixels, each pixel including a group of different monochromatic luminescent elements, wherein adjacent pixels in each group are spaced an equal distance apart, arranged so that a pitch $P_0$ between adjacent light emitting pixels of the same group is less than a pitch $P_1$ between adjacent groups, and said groups of monochromatic luminescent elements arranged so that the pitch $P_0$ between adjacent monochromatic luminescent groups in one group of pixels is less than the pitch $P_1$ between monochromatic luminescent groups in adjacent pixel groups.

6. A display apparatus according to claim 5, wherein when an unequal pitch rate $\alpha$ is defined as pitch $P_0$ divided by pitch $P_1$, said apparatus satisfies a relation of $0.8 \leq \alpha < 1.0$.

7. A display apparatus according to claim 5, wherein said plurality of light emitting pixels are arranged in matrix form in groups of four.

* * * * *